(12) United States Patent
Martin et al.

(10) Patent No.: US 7,603,341 B2
(45) Date of Patent: Oct. 13, 2009

(54) UPDATING THE CONTENT OF A PRESENTATION VEHICLE IN A COMPUTER NETWORK

(75) Inventors: Anthony G. Martin, Los Altos, CA (US); Scott Vandevelde, Menlo Park, CA (US); David L. Goulden, Redwood City, CA (US)

(73) Assignee: Claria Corporation, Redwood City, CA (US)

( * ) Notice: Subject to any disclaimer, the term of this patent is extended or adjusted under 35 U.S.C. 154(b) by 1203 days.

(21) Appl. No.: 10/462,574

(22) Filed: Jun. 16, 2003

(65) Prior Publication Data

US 2004/0122808 A1 Jun. 24, 2004

Related U.S. Application Data

(63) Continuation-in-part of application No. 10/289,123, filed on Nov. 5, 2002, now Pat. No. 7,512,603.

(60) Provisional application No. 60/457,524, filed on Mar. 25, 2003.

(51) Int. Cl.
*G06F 17/30* (2006.01)
*G06F 3/048* (2006.01)

(52) U.S. Cl. .......................................... 707/3; 715/764
(58) Field of Classification Search ................. 707/1–4, 707/102
See application file for complete search history.

(56) References Cited

U.S. PATENT DOCUMENTS

| 5,446,919 | A | 8/1995 | Wilkins |
| 5,794,259 | A | 8/1998 | Kikinis |
| 6,026,368 | A | 2/2000 | Brown et al. |
| 6,183,366 | B1 | 2/2001 | Goldberg et al. |
| 6,295,061 | B1 | 9/2001 | Park et al. |

(Continued)

FOREIGN PATENT DOCUMENTS

WO WO 01/90917 A2 11/2001

(Continued)

OTHER PUBLICATIONS

SideStep, The Traveler's Search Engine; Webpage [online] [retrived on Oct. 7, 2004]; retrieved from the internet: <URL:http://www.sidestep.com/main.html.

(Continued)

*Primary Examiner*—Uyen T. Le
(74) *Attorney, Agent, or Firm*—Sheppard, Mullin, Richter & Hampton, LLP

(57) ABSTRACT

In one embodiment, a first search result responsive to a first search request is displayed in a presentation vehicle that is separate from a browser employed by an end-user to submit the first search request. The presentation vehicle may be a pop-under, for example. Upon detection of a second search request submitted by the end-user, the same presentation vehicle may be updated to display a second search result. In another embodiment, a presentation vehicle is employed to display a first content responsive to a first end-user behavior. An end-user behavior may be an activity that an end-user engages in while on a computer network. The end-user behavior may be navigation from one web site to another web site or submission of a search request, for example. The presentation vehicle may be updated to display a second content in response to a second end-user behavior.

6 Claims, 15 Drawing Sheets

U.S. PATENT DOCUMENTS

| | | | |
|---|---|---|---|
| 6,297,819 | B1 | 10/2001 | Furst |
| 6,356,908 | B1 | 3/2002 | Brown et al. |
| 6,370,527 | B1 * | 4/2002 | Singhal ......................... 707/6 |
| 6,457,009 | B1 | 9/2002 | Bollay |
| 6,594,654 | B1 * | 7/2003 | Salam et al. ................... 707/3 |
| 6,601,041 | B1 | 7/2003 | Brown et al. |
| 2002/0154163 | A1 | 10/2002 | Melchner |
| 2002/0194151 | A1 | 12/2002 | Fenton et al. |
| 2004/0133845 | A1 * | 7/2004 | Forstall et al. .............. 715/500 |
| 2004/0167928 | A1 | 8/2004 | Anderson et al. |

OTHER PUBLICATIONS

Visual Search ToolBar—Graphically Enhance Search Results, 2004 Viewpoint Corporation; Webpage [online] [retrieved on Oct. 7, 2004]; retrieved from the internet: <URL:http://www.viewpoint.com/pub/toolbar/download.html.

PCT International Search Report for Int'l Application No. PCT/US04/07714 (2 sheets).

* cited by examiner

UPDATING THE CONTENT OF A PRESENTATION VEHICLE IN A COMPUTER NETWORK

CROSS-REFERENCE TO RELATED APPLICATION

This application is a continuation-in-part of U.S. application Ser. No. 10/289,123, entitled "RESPONDING TO END-USER REQUEST FOR INFORMATION IN A COMPUTER NETWORK", filed on Nov. 5, 2002 now U.S. Pat. No. 7,512,603, by Eugene A. Veteska, David L. Goulden, and Anthony G. Martin, which is incorporated herein by reference in its entirety.

This application claims the benefit of U.S. Provisional Application No. 60/457,524, entitled "UPDATING THE CONTENT OF A PRESENTATION VEHICLE IN A COMPUTER NETWORK", filed by Scott Vandevelde, David L. Goulden, and Anthony G. Martin on Mar. 25, 2003, which is incorporated herein by reference in its entirety.

BACKGROUND OF THE INVENTION

1. Field of the Invention

The present invention relates generally to computer systems, and more particularly but not exclusively to presentation of information in a computer network.

2. Description of the Background Art

The Internet is an example of a computer network. On the Internet, end-users on client computers may access various types of information resident in server computers. A server computer that provides information over the Internet is also referred to as a "web server" or a "web site". A web site may provide information about various topics or offer goods and services. Some web sites include a search engine that allows an end-user to search on the Internet. Examples of such web sites include Yahoo, Google, and Alta Vista. A web site may also include a search engine for searching the web site. For example, an on-line bookstore may include a search engine for allowing a prospective buyer to look for specific novels available from the bookstore.

Just like in other medium such as radio and television, companies may advertise on the Internet. Advertising revenues may help pay for the development and maintenance of free software (i.e., a computer program) or a web site. Advertisements on the Internet may be displayed using various presentation vehicles, such as pop-ups, pop-unders, and banners. Pop-ups are typically displayed over a web page to immediately attract an end-user's attention. Pop-unders, on the other hand, are displayed under a web page, and are not visible until the end-user closes the web page. Banners are typically displayed as part of a web page.

Generally speaking, the efficacy of an advertising campaign on the Internet may be measured in terms of "click-through" rate, which takes into account the number of times an advertisement has been clicked on (e.g., using a mouse) by end-users. The higher the click-through rate, the more effective the advertising. Because effective advertising results in higher revenue not only for manufacturers of products being advertised but also for companies who display the advertisements, increasing click-through rates is generally desirable.

To increase the chance of an end-user clicking on an advertisement, advertisers have developed "targeting techniques" to match advertisements with particular end-users. For example, some web sites employ cookies to keep track of end-user purchasing activity on the web site. This allows a web site to advertise to an end-user products that are related to those previously purchased by the end-user. A specific example of this targeting technique is to advertise a romance novel to an end-user who has previously purchased books in the same category. Some advertisers also develop end-user profiles that are based on demographic information. An advertiser may use an end-user profile to identify advertisements that may be of interest to a particular end-user.

SUMMARY

The present invention relates to presentation of information in a computer network. The present invention may be employed in various applications including advertising in a computer network such as the Internet, for example.

In one embodiment, a first search result responsive to a first search request is displayed in a presentation vehicle that is separate from a browser employed by an end-user to submit the first search request. The presentation vehicle may be a pop-under, for example. Upon detection of a second search request submitted by the end-user, the same presentation vehicle may be updated to display a second search result. This advantageously minimizes proliferation of presentation vehicles on the end-user's computer screen.

In another embodiment, a presentation vehicle is employed to display a first content responsive to a first end-user behavior. An end-user behavior may be an activity that an end-user engages in while on a computer network. The end-user behavior may be navigation from one web site to another web site or submission of a search request, for example. The presentation vehicle may be updated to display a second content in response to a second end-user behavior.

These and other features of the present invention will be readily apparent to persons of ordinary skill in the art upon reading the entirety of this disclosure, which includes the accompanying drawings and claims.

DETAILED DESCRIPTION

In the present disclosure, numerous specific details are provided such as examples of systems, components, and methods to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

It is to be noted that although embodiments of the present invention are described herein in the context of the Internet, the present invention is not so limited and may be used in other data processing applications.

Figure 1:
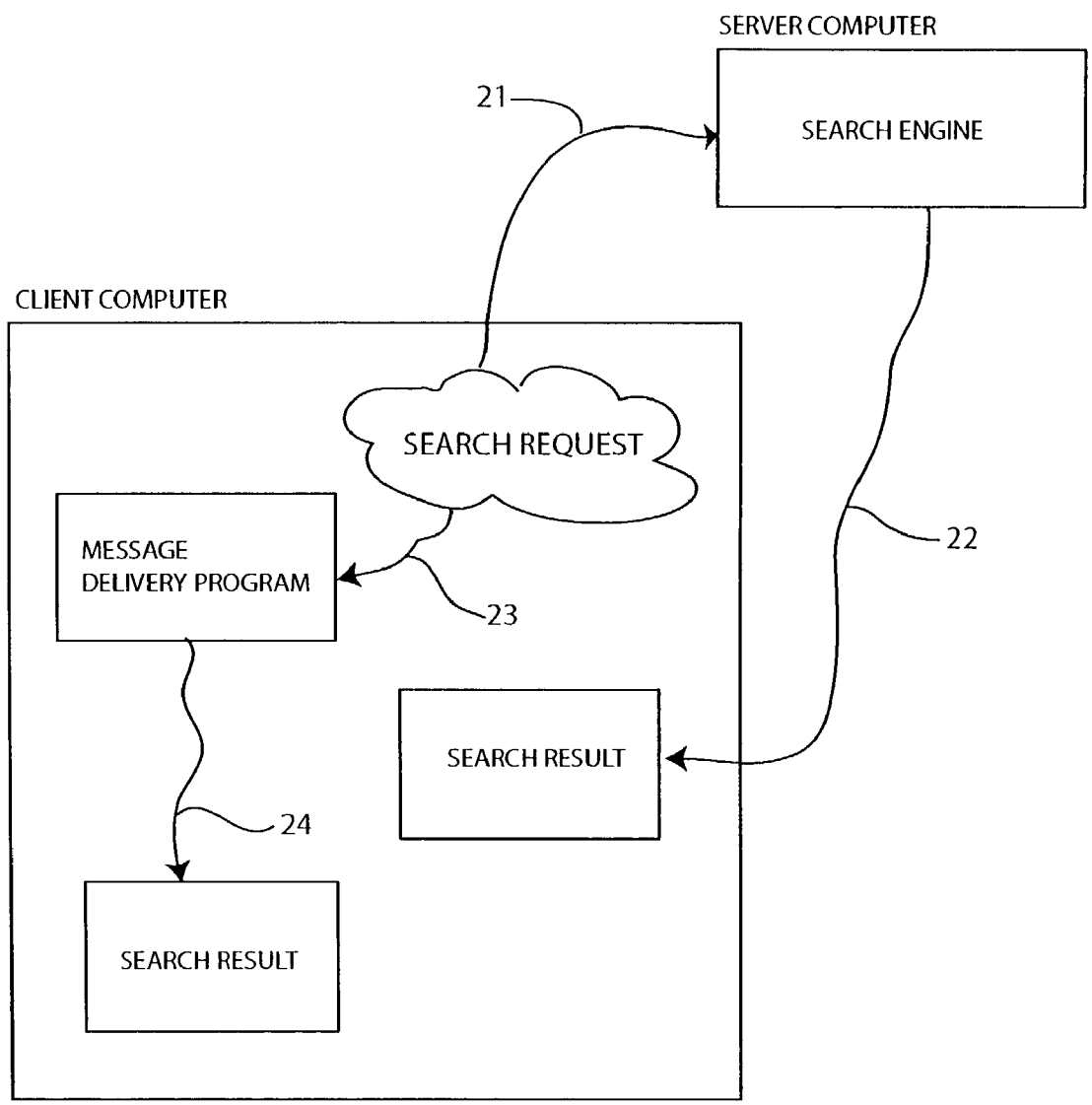
FIG. 1 schematically illustrates an embodiment of the present invention.

An embodiment of the present invention is schematically illustrated in FIG. 1. In FIG. 1, an end-user on a client computer submits a search request to a search engine (hereinafter referred to as "original search engine") on the Internet (see arrow 21). The original search engine may perform an "Internet search", or a search limited to a particular web site or domain name. The search request may be a query comprising one or more keywords, for example. The original search engine responds to the search request by sending a search result to the client computer (see arrow 22). The search result may include a list of documents (e.g., web pages), links to documents, or other information relating to the keywords. A specific example of the just described scenario is an end-user typing the keyword "car" in a search engine and receiving back links to web sites that talk about car clubs, exotic cars, car racing, and like information.

A search request is an express manifestation of end-user interest in something. That is, an end-user requesting information about a topic has expressed an interest in that topic. To take advantage of this, a message delivery program resident in the client computer listens for requests for information such as a search request. When the message delivery program detects that an end-user is performing a search (see arrow 23), the message delivery program responds to the search request by displaying its own search result in the client computer (see arrow 24). The search result of the message delivery program may be displayed in a window that is under a window containing the search result from the original search engine, for example. The search result of the message delivery program may include information cached in the client computer, served by a server computer (e.g., an adserver), or provided by another search engine, for example. The search result displayed by the message delivery program may contain advertisements relating to the keyword included in the end-user's search request. Because the advertisements relate to the end-user's search request, the probability that the end-user will be interested in one or more of the advertisements is thus improved. In the car example, the message delivery program may compile a list of car-related advertisements and display them to the end-user.

Preferably, the message delivery program is resident in the client computer so that it can respond to an end-user's search request even when the end-user uses different search engines. That is, unlike other targeting techniques that only work when an end-user is on a particular web site, embodiments of the present invention may work across different web sites. An end-user may obtain the message delivery program by itself or along with free or reduced-cost computer programs, services, and other products.

Figure 2:
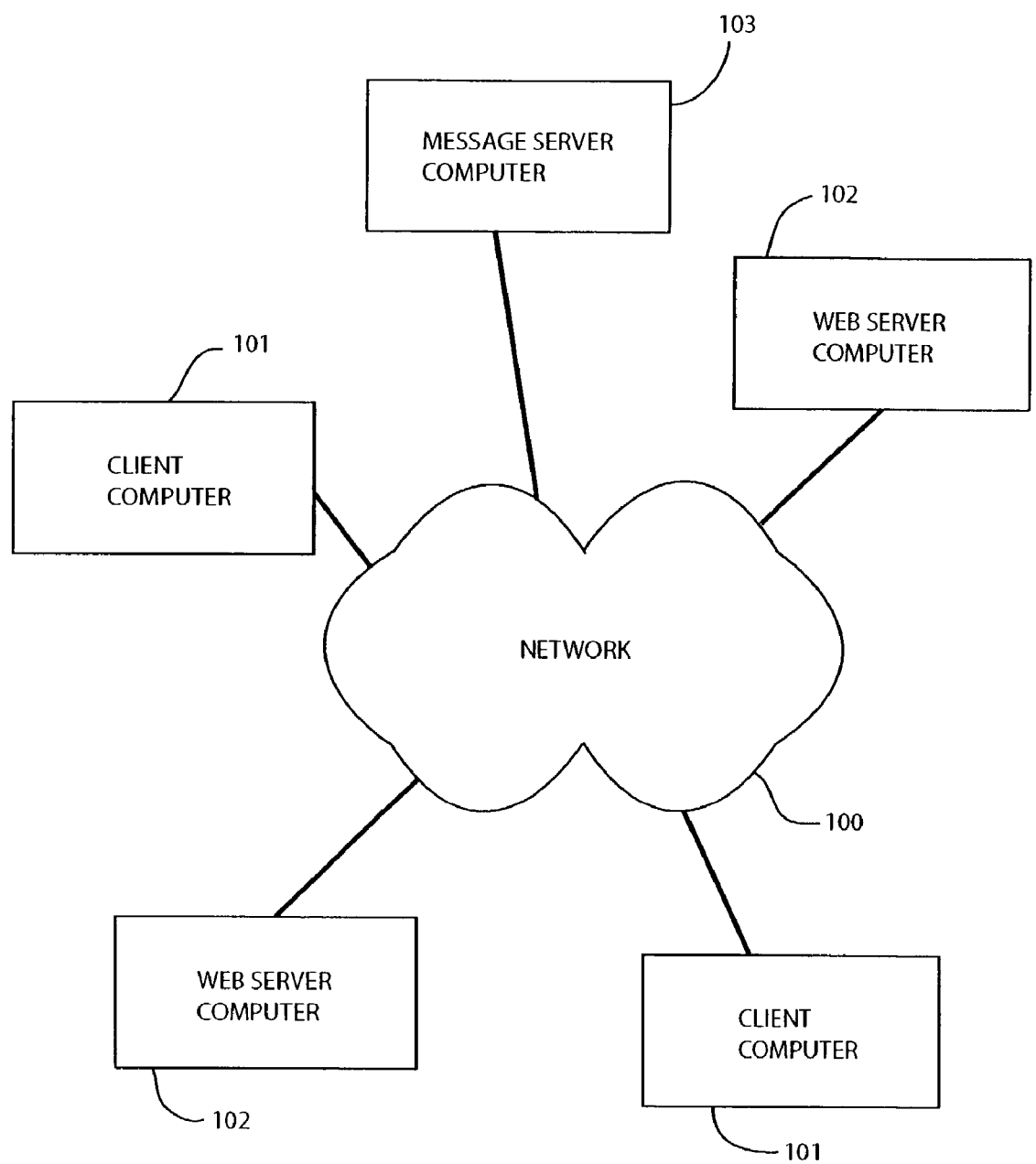
FIG. 2 shows a schematic diagram of a computer network in accordance with an embodiment of the present invention.

Referring now to FIG. 2, there is shown a schematic diagram of a computer network 100 in accordance with an embodiment of the present invention. Network 100 may include one or more client computers 101, one or more web server computers 102, one or more message server computers 103, and other computers not shown. Intermediate nodes such as gateways, routers, bridges, Internet service provider networks, public-switched telephone networks, proxy servers, firewalls, and other network components are not shown for clarity. In the example of FIG. 2, network 100 includes the Internet; however, other types of computer networks may also be used. Computers may be coupled to network 100 using any type of connection without detracting from the merits of the present invention.

A client computer 101 is typically, but not necessarily, a personal computer such as those running the Microsoft Windows™, Apple Macintosh™, Linux, or UNIX operating systems. An end-user may employ a suitably equipped client computer 101 to get on network 100 and access computers coupled thereto. For example, a client computer 101 may be used to access web pages from a web server computer 102. It is to be noted that as used in the present disclosure, the term "computer" includes any type of data processing device including personal digital assistants, digital telephones, wireless terminals, and the like.

A web server computer 102 may be a web site containing information designed to attract end-users surfing on the Internet. A web server computer 102 may also include advertisements, downloadable computer programs, a search engine and products available for online purchase. A web server computer 102 may also be an ad server for delivering advertisements to a client computer 101.

A message server computer 103 may include the functionalities of a web server computer 102. Additionally, in one embodiment, a message server computer 103 may also include message units for delivery to a client computer 101. The message units may contain advertisements, for example. Message units are further described below. A message server computer 103 may also include downloadable computer programs and files for supporting, updating, or maintaining components in a client computer 101.

Web server computers 102 and message server computers 103 are typically, but not necessarily, server computers such as those available from Sun Microsystems, Hewlett-Packard, or International Business Machines. A client computer 101 may communicate with a web server computer 102 or a message server computer 103 using client-server protocol. It is to be noted that client-server computing is well known in the art and will not be further described here.

Figure 3:
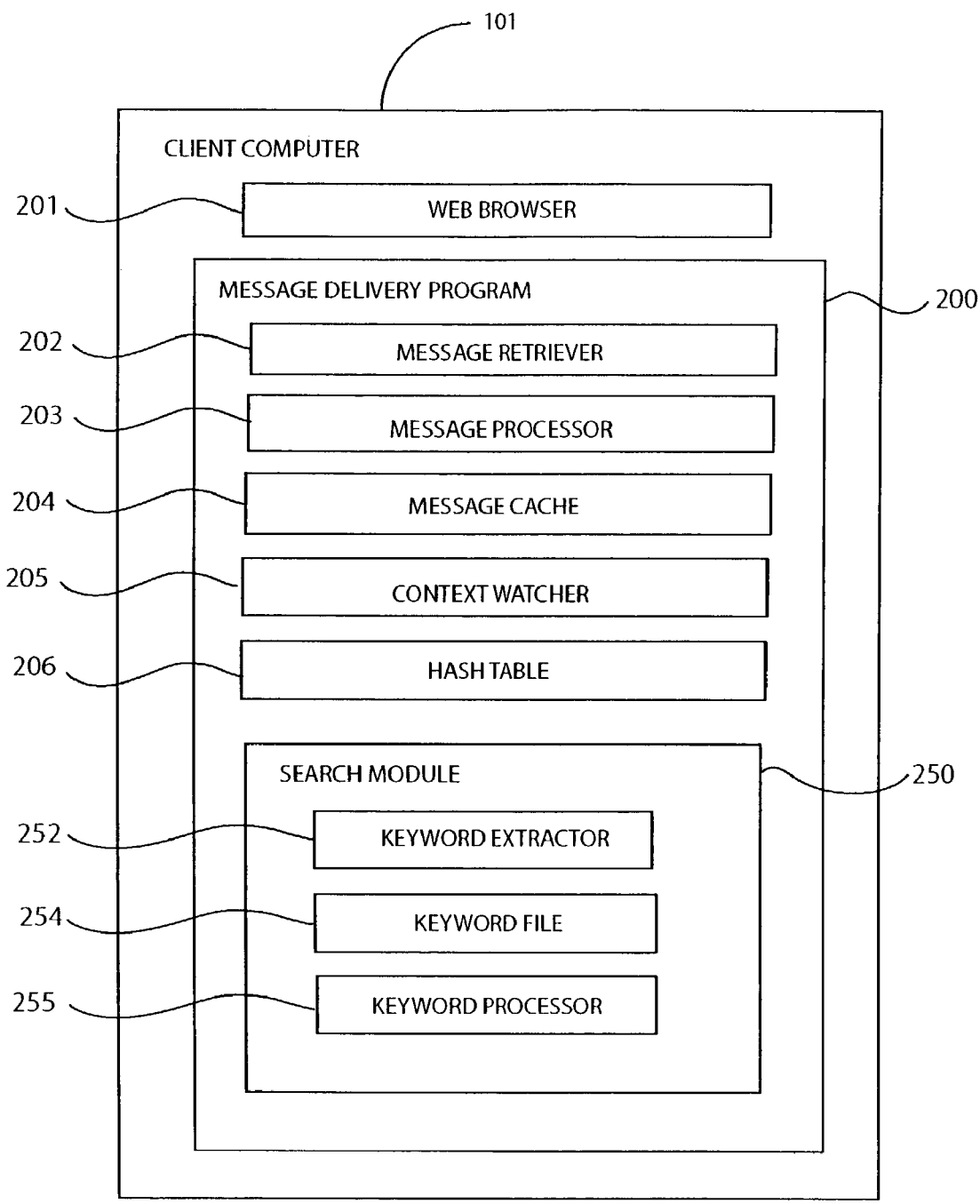
FIG. 3 shows a schematic diagram of a client computer in accordance with an embodiment of the present invention.

FIG. 3 schematically illustrates the components of a client computer 101 in accordance with an embodiment of the present invention. In one embodiment, the components of client computer 101 shown in FIG. 3 are implemented in software. It should be understood, however, that components in the present disclosure may be implemented in hardware, software, or a combination of hardware and software (e.g., firmware). Software components may be in the form of computer-readable program code stored in a computer-readable storage medium such as memory, mass storage device, or removable storage device. For example, a computer-readable medium may comprise computer-readable code for performing the function of a particular component. Likewise, computer memory may be configured to include one or more components, which may then be run by a microprocessor. Components may be implemented separately in multiple modules or together in a single module.

As shown in FIG. 3, client computer 101 may include a web browser 201 and a message delivery program 200. Web browser 201 may be a commercially available web browser or web client running on a client computer 101. In one embodiment, web browser 201 is the Microsoft Internet Explorer™ web browser.

In one embodiment, message delivery program 200 is downloadable from a message server computer 103. Message delivery program 200 may be downloaded in conjunction with the downloading of another computer program. For example, message delivery program 200 may be downloaded to a client computer 101 along with a utility program that is provided free of charge or at a reduced cost. The utility program may be provided to an end-user in exchange for the right to deliver messages to the end-user via message delivery program 200. In essence, revenue (e.g., advertising fees) from messages delivered to the end-user helps defray the cost of creating and maintaining the utility program.

Message delivery program 200 may include a message retriever 202, a message processor 203, a message cache 204, a context watcher 205, a hash table 206, and a search module 250. Other components such as operating system components, utility programs, application programs, and the like are not shown for clarity of illustration.

Message retriever 202 may include computer-readable program code for requesting message units from message server computer 103. As will be explained later on in connection with FIG. 5, a message unit may include a message content. A message content may include, without limitation, information to be displayed on a computer screen, audio to be played, or computer-readable program code (e.g., Java applet, script, HTML, hyperlink, pointer to a web page containing a search result). In one embodiment, a message unit may be a rules message unit or a search message unit. A search message unit may be distinguished from a rules message unit by a field in the message unit referred to as a "search field" (see search field 352 in FIG. 5). A rules message unit is processed when a set of rules has been satisfied, whereas a search message unit is processed when the end-user performs a search using certain keywords. Message units are processed according to their message contents. For example, a message unit containing displayable message content is processed by displaying its message content on a computer screen, a message unit whose message content includes computer-readable program code is processed by running its message content, and so on.

Still referring to FIG. 3, message retriever 202 monitors web browser 201 for the uniform resource locator (URL) of web sites visited by an end-user surfing on the Internet. For each domain visited by an end-user, message retriever 202 may send a request packet to message server computer 103. In one embodiment, a request packet includes:

(a) the end-user's unique identification (ID) number;
(b) the ID number of client computer 101;
(c) the local time;
(d) the domain name of the web site visited by the end-user; and
(e) a list of message units stored in message cache 204.

In one embodiment, personal information such as the actual name of the end-user, credit card information, residence address, and the like is stored solely in client computer 101 to protect the end-user's privacy.

Message server computer 103 checks if there is a corresponding message unit for each request packet received from client computer 101. If so, message server computer 103 sends the corresponding message unit to client computer 101. For example, message retriever 202 may send a request packet to message server computer 103 as an end-user navigates from "storekeeper.com" to "cars.com." If a message unit is available for the domain "cars.com", message server computer 103 will send that message unit to client computer 101.

Client computer 101 may also include a hash table 206. Hash table 206 may contain information for determining whether a message unit is available for a particular domain. This allows message retriever 202 to first query hash table 206 before sending a request packet to message server computer 103. If hash table 206 indicates that there is a message unit for a domain visited by the end-user, message retriever 202 may proceed to send a request packet to message server computer 103. Otherwise, message retriever 202 may not send a request packet, thereby minimizing the amount of request packets sent to and processed by message server computer 103.

Message processor 203 may include computer-readable program code for processing a message unit. Message processor 203 may process a message unit by displaying its message content. Message processor 203 may display a message content using a variety of presentation vehicles including pop-ups, pop-unders, banners, message boxes, text boxes, sliders, separate windows, windows embedded in a web page, and other mechanisms for displaying information. Message processor 203 may also process a message unit by playing its message content if the message content is audio or video, or by running its message content if the message content is computer-readable program code, for example. As an example, message processor 203 may process a message unit by displaying a pop-under (or other presentation vehicle) pointed to a web page containing a search result.

Context watcher 205 may include computer-readable program code for determining if a message unit has been triggered for processing. Context watcher 205 checks message cache 204 for rules message units whose rules have been satisfied and search message units that relate to an end-user's search request. If context watcher 205 finds such a rules message unit or a search message unit, context watcher 205 alerts message processor 203 to process the message unit.

Message delivery program 200 further includes a search module 250. In one embodiment, search module 250 includes the following components: a keyword extractor 252, a keyword file 254, and a keyword processor 255.

Keyword extractor 252 may include computer-readable program code for parsing a search request. In one embodiment, keyword extractor 252 parses a search request to extract one or more keywords from a URL displayed in the address window of a web browser in response to a search request by an end-user. Popular search engines respond to a search request by pointing the web browser employed by the end-user to a web page containing the search result. The URL of that web page may be parsed to extract the keywords chosen by the end-user for his search. For example, performing a search for "hotrod" and "car" in a fictitious search engine referred to herein as "finderskeepers.com" will result in a web browser being pointed to a web page with the following URL:

http://search.finderskeepers.com/bin/search?p=hotrod+car

The web page with the URL "http://search.finderskeepers.com/bin/search?p=hotrod+car" contains the search result for the keywords "hotrod" and "car". Knowing the URL format employed by finderskeepers.com allows extraction of the words following ". . . /search?p=" and separated by "+". String manipulation functions may be used to extract keywords from the URL. It is to be noted that different search engines may employ different URL formats. Accordingly, keyword extractor 252 may first parse the URL to determine the name of the search engine, and then employ parsing rules for that search engine. In the present example, keyword extractor 252 may first parse the URL "http://search.finderskeepers.com/bin/search?p=hotrod+car" to get the name of the search engine, which is "...finderskeepers.com/...", and then apply parsing rules for finderskeepers.com. Keyword extractor 252 may take advantage of delimeters and end of string indicators employed by a particular search engine to parse a URL. In one embodiment, keyword extractor 252 includes parsing rules for popular search engines.

Figure 4A:
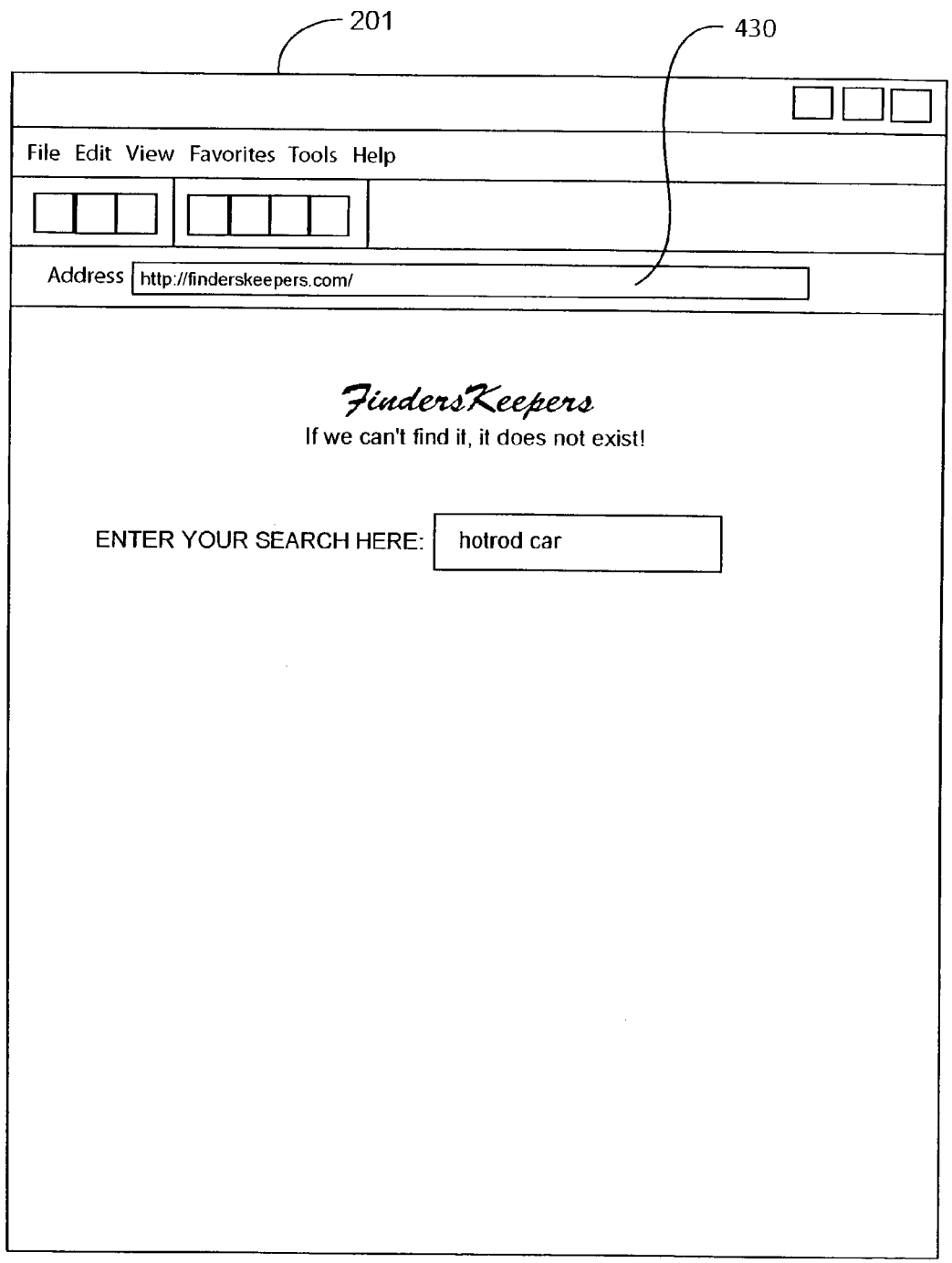
FIG. 4A shows a web browser pointed to an Internet search engine.
Figure 4B:
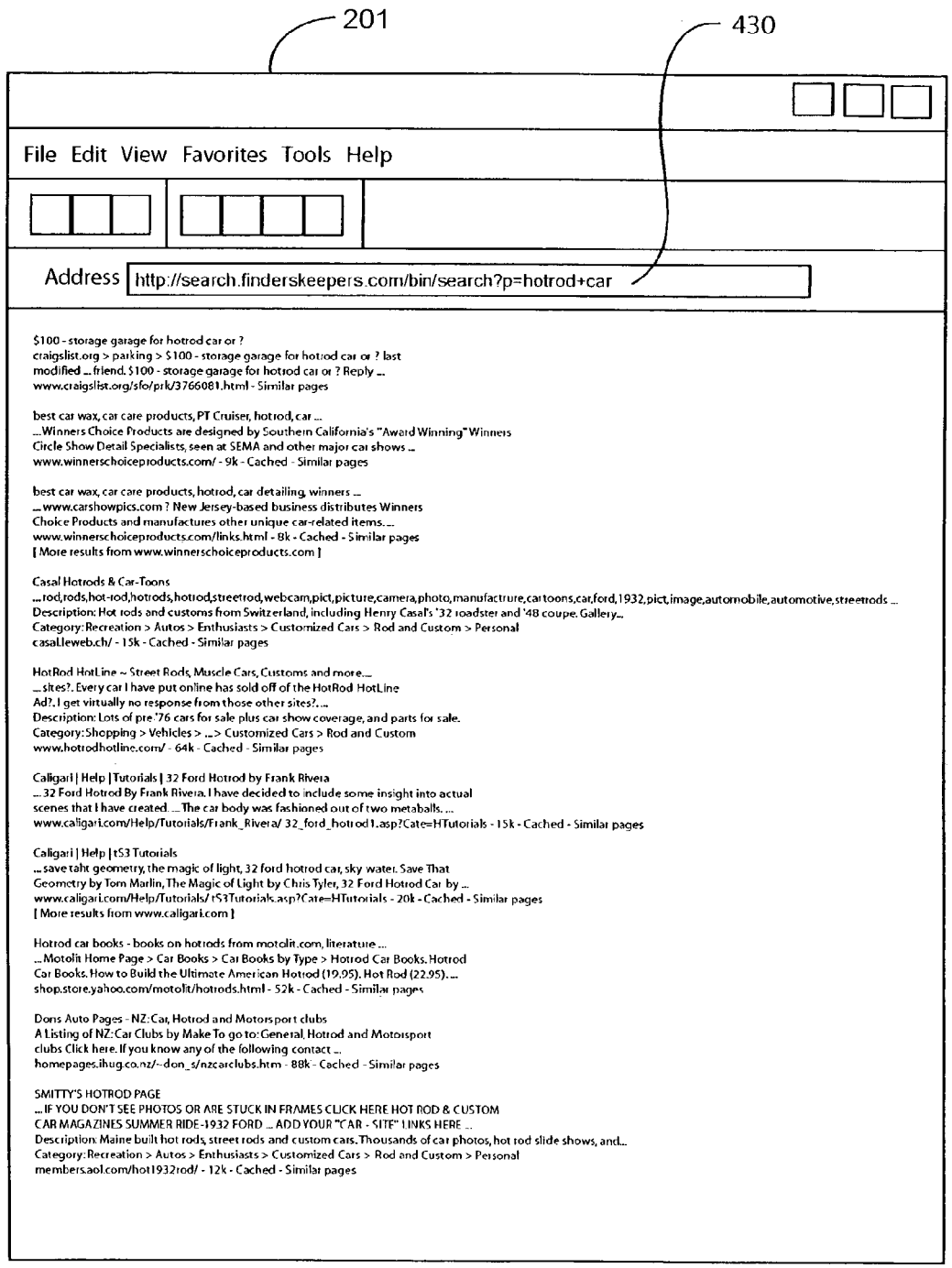
FIG. 4B shows the web browser of FIG. 4A after a search.

FIG. 4A shows a web browser 201 pointed to the URL indicated in address window 430. In the example of FIG. 4A, web browser 201 is pointed to finderskeepers.com where an end-user is searching for information about hotrods and cars. FIG. 4B shows web browser 201 and address window 430 after the search using the keywords "hotrod" and "car".

Referring back to FIG. 3, search module 250 also includes a keyword file 254. In one embodiment, keyword file 254 is a text file containing a list of relevant keywords referred to as "an include list" and a list of non-relevant keywords referred to as an "exclude list". Note that keyword file 254 may have also have an include list but not an exclude list or vice versa. Keyword file 254 may be downloadable from message server computer 103 to ensure that client computer 101 always has the most current keyword file. Keywords in the include list have corresponding message units, whereas keywords in the exclude list have no corresponding message units. As will be explained later below, keywords in the include list are processed by keyword processor 255, whereas keywords in the exclude list are not processed. In one embodiment, keyword processor 255 processes a keyword by sending the keyword to message server computer 103 to obtain further information about the keyword. By first examining the exclude list before sending keywords to message server computer 103, keywords that have no corresponding message units are identified at client computer 101, thereby minimizing traffic to message server computer 103. Likewise, traffic to message server computer 103 may be minimized by first determining if a keyword is in the include list before sending the keyword to message server computer 103. Table 1 shows the contents of an example keyword file 254.

TABLE 1

| Include List | Exclude List |
|---|---|
| hotrod | paper |
| car | the |
| books | for |
| computer | Britney |
| cellular | ... |
| sports | ... |
| wine | ... |
| ... | ... |

In the example of Table 1, the exclude list includes non-relevant words such as commonly used words that are too general to be useful. The exclude list may also include words that have no commercial value. For example, "Britney" may have no commercial value to most advertisers except those affiliated with or licensed by Britney the pop-star.

In the example of Table 1, the include list includes relevant words. In one embodiment, a word is considered relevant if there is a corresponding message unit for that word. For example, the word "computer" may be relevant if there is a message unit containing an advertisement for a personal computer. Similarly, the word "book" may be relevant if there is a message unit relating to books.

Still referring to FIG. 3, search module 250 includes keyword processor 255. Keyword processor 255 may include computer-readable program code for processing a keyword. In one embodiment, a keyword may be processed by determining if a keyword is relevant and working with message server computer 103 to identify message units 301 that relate to the keyword. Keyword processor 255 is further described in connection with FIG. 6.

Figure 5:
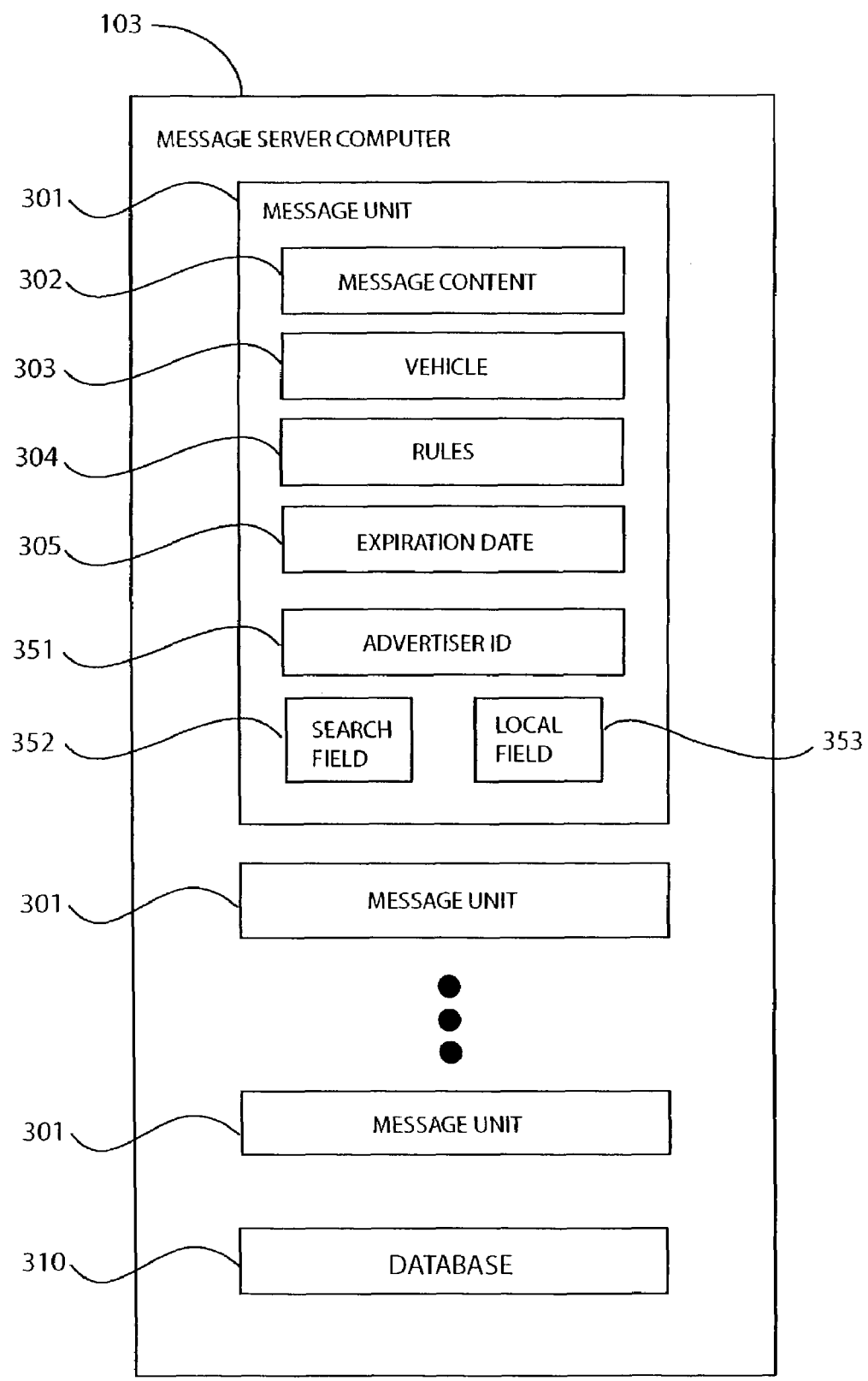
FIG. 5 shows a schematic diagram of a message server computer in accordance with an embodiment of the present invention.

FIG. 5 schematically illustrates the components of a message server computer 103 in accordance with an embodiment of the present invention. As mentioned, message server computer 103 receives request packets from a client computer 101. Each received request packet may include the domain name of the web site visited by an end-user. Message server computer 103 uses the domain name to find all message units available for that web site. For example, a message unit may contain an advertisement for a car company that wants to display its advertisement to end-users visiting car-related web sites, such as the "cars.com" web site. When a request packet indicates that an end-user is on "cars.com", the message unit containing the car company's advertisement will be sent to the requesting client computer 101.

A message server computer 103 may include one or more message units 301 and a database 310. Database 310 may be a commercially available database program. Database 310 is used to keep track of message units 301 and keyword related information in message server computer 103. For example, message server computer 103 may query database 310 for all message units 301 available for a particular web site.

A message unit 301 may include a message content 302, a vehicle 303, rules 304, an expiration date 305, an advertiser ID 351, a search field 352, and a local field 353. Message content 302 may include computer-readable program code, text, images, audio, video, hyperlink, and other information. A message content 302 may be an advertisement or a search result (or pointers thereto) to be displayed on a computer screen, for example.

Vehicle 303 indicates the presentation vehicle to be used in presenting message content 302 to an end-user. For example, vehicle 303 may call for the use of a pop-up, pop-under, banner, message box, text box, slider, separate window, window embedded in a web page, and the like.

A message unit 301 may include a search field 352. A search field 352 may be a Boolean variable for indicating whether a message unit 301 is a rules message unit or a search message unit. In one embodiment, a message unit 301 is a rules message unit when search field 352 is set to logical FALSE; otherwise, the message unit 301 is a search message unit.

As will be explained further below, a message unit 301 may include a local field 353 for indicating whether a keyword is to be evaluated against a local include list only.

A message unit 301 may include rules 304 for specifying the conditions that need to be satisfied before the message unit is triggered for processing. Rules 304 may specify to display a message content 302 when an end-user navigates to a specific web page or as soon as the message unit 301 is received in a client computer 101. For example, a car company may contract with the operator of a message server computer 103 to deliver a message unit 301 containing an advertisement for a minivan (hereinafter, "minivan message unit"). The rules 304 of the minivan message unit may specify that the minivan advertisement is to be displayed to end-users viewing the minivan web page of "cars.com". In this example, the minivan web page of cars.com has the URL "www.cars.com/ minivans". When an end-user visits the main page (or any web page) of "cars.com", message retriever 202 (see FIG. 3) will send a request packet to message server computer 103 indicating that the end-user is on "cars.com". In response, message server computer 103 will send the minivan message unit to client computer 101. When the end-user navigates to the URL "www.cars.com/minivans", context watcher 205 will detect that the minivan message unit has been triggered for display (i.e., rules 304 of the minivan message unit have been satisfied). Context watcher 205 will accordingly inform message processor 203, which will then process the minivan message unit by displaying its message content.

Rules 304 may also include: (a) a list of domain names at which the content of a message unit 301 is to be displayed, (b) URL sub-strings that will trigger displaying of the content of the message unit 301, and (b) time and date information. As can be appreciated, rules 304 may also be extended to take into account additional information relating to an end-user (as identified by a corresponding end-user ID) such as the end-user's frequent flyer affiliation, club memberships, type of credit card used, hobbies and interests, and basic demographic information. End-user related information may be stored in client computer 101 or database 310 of message server computer 103. End-user related information may be used for targeted advertising purposes, for example.

As shown in FIG. 5, a message unit 301 may also include an expiration date 305. Expiration date 305 indicates the latest date and time the message unit 301 can still be displayed. Expired message units 301 do not have to be processed and may be removed from client computer 101.

A message unit 301 may include an advertiser ID 351 for identifying a particular search message unit. Note that an advertiser ID 351 does not necessarily have to be associated with an advertiser. Additionally, an advertiser ID 351 does not necessarily have to identify a message unit 301 that contains advertising. That is, an advertiser ID 351 may be used to keep track of message units 301 in general.

Other techniques for receiving and processing message units are also described in the following commonly-assigned disclosure, which is incorporated herein by reference in its entirety: U.S. application Ser. No. 10/152,204, filed on May 21, 2002, by Scott G. Eagle, David L. Goulden, Anthony G. Martin, and Eugene A. Veteska.

Figure 6A:
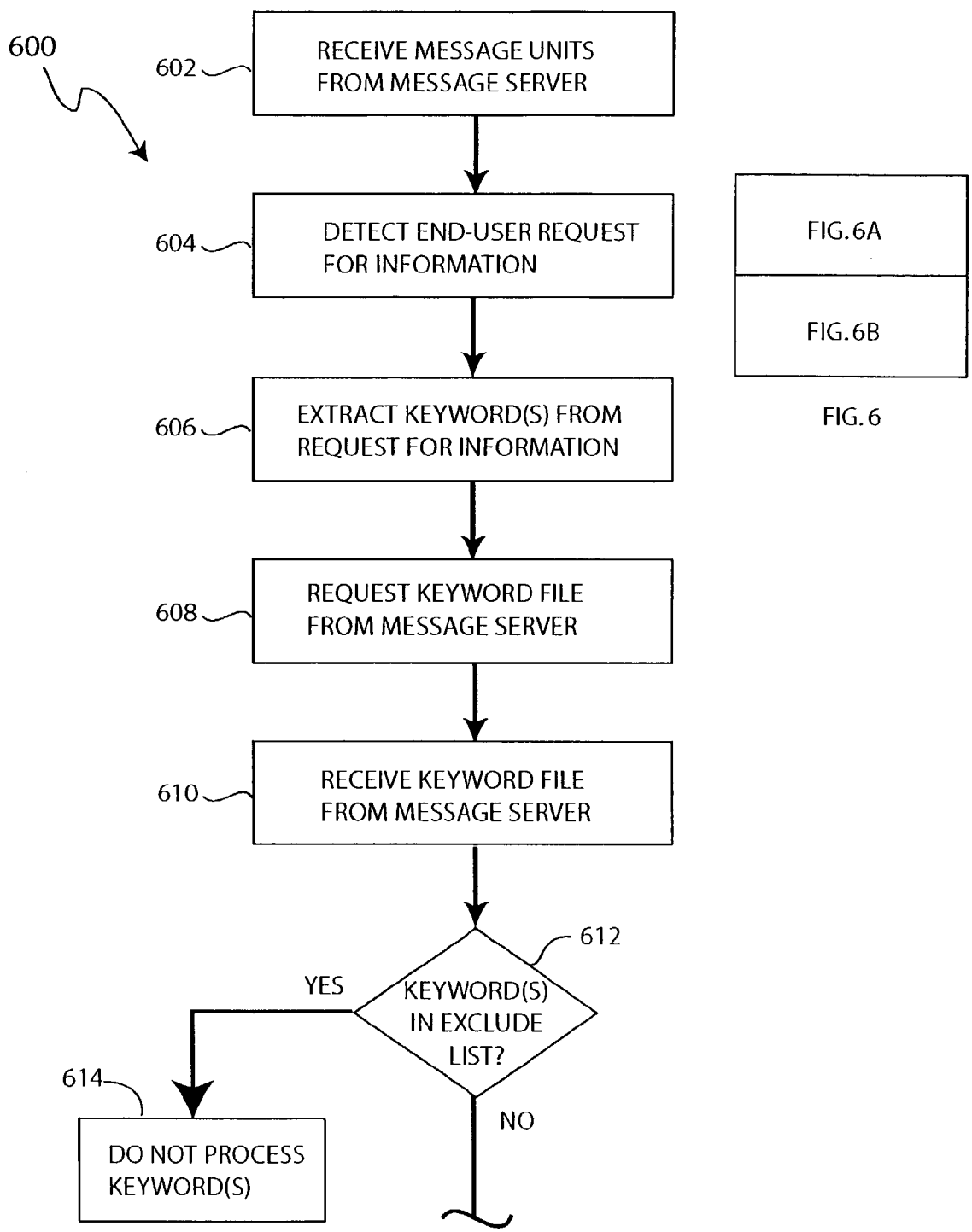
FIG. 6, which consists of FIGS. 6A and 6B, shows a flow diagram of a method of responding to an end-user request for information in accordance with an embodiment of the present invention.
Figure 6B:
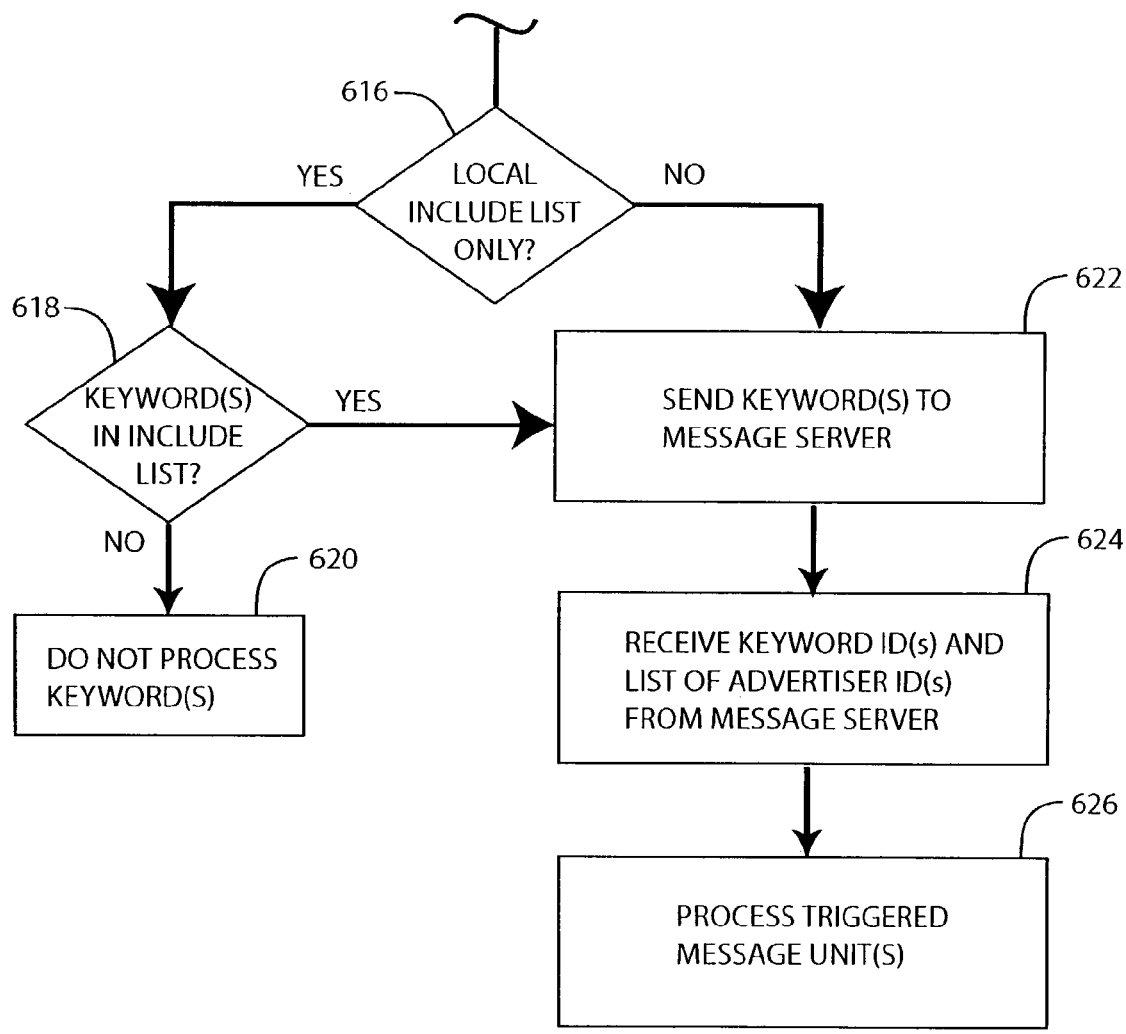

FIG. 6, which consists of FIGS. 6A and 6B, shows a flow diagram of a method 600 of responding to end-user request for information in accordance with an embodiment of the present invention. The steps of method 600 are described herein using the aforementioned components of client computer 101 and message server computer 103 as an example. However, it should be understood that method 600 is not so limited and may also be implemented using other components.

Beginning in step 602, one or more message units 301 are received in client computer 101 from message server computer 103. In one embodiment, a message unit 301 is received in client computer 101 in response to an end-user navigating to a particular web site. That particular web site may include a search engine, for example. Navigation to a web site that has a search engine indicates that the end-user is intending to perform a search, and thus causes delivery of search message units intended for that web site. Message retriever 202 monitors web browser 201 for the URL of web sites visited by the end-user, and accordingly asks message server computer 103 for message units available for each web site, if any. Message units 301 received from message server computer 103 may be stored in message cache 204. As mentioned, a message unit 301 may be a rules message unit or a search message unit depending on the state of its search field 352 (see FIG. 5).

In step 604, message retriever 202 detects an end-user request for information and so informs keyword processor 255. An example end-user request for information is a search request submitted to an Internet search engine. In one embodiment, a search request is detected by monitoring an address window of a web browser (e.g., see address window 430 shown in FIG. 4A) for a URL with the string "search" in it (e.g., ". . . search.domain_name/ . . .") or a domain name of a known search engine. It is to be noted that the mechanics of monitoring an end-user's browsing activity, such as determining where an end-user is navigating to, what an end-user is typing on a web page, when an end-user activates a mouse or keyboard, and the like, is, in general, known in the art and is not further described here.

In step 606, keyword extractor 252 extracts one or more keywords from the end-user request for information. The keywords may be words employed in a search request submitted to a search engine. In one embodiment, keywords are extracted by parsing a URL appearing in an address window of a web browser after the submission of a search request.

In step 608, keyword processor 255 requests message server computer 103 to send a keyword file 254 to client computer 101. A keyword file 254 may be periodically downloaded from message server computer 103 to ensure that the keywords contained therein are current. Depending on the application, a keyword file 254 may also be downloaded once upon installation of message delivery program 200 in client computer 101, or from time to time but not necessarily every time an end-user navigates to a new web site.

In step 610, client computer 101 receives a keyword file 254 from message server computer 103. An include list in a keyword file 254 in client computer 101 is also referred to as a "local include list".

In step 612, keyword processor 255 determines if a keyword extracted from a search request is in an exclude list of keyword file 254. If the keyword is in the exclude list, the keyword is not deemed relevant and accordingly ignored by keyword processor 255. Processing of the keyword continues to step 616 if the keyword is not in the exclude list.

In step 616, keyword processor 255 determines if it is supposed to limit its determination of whether the keyword is relevant or not to an include list locally available in a keyword file 254 in client computer 101 (instead of in message server computer 103). Whether or not keyword processor 255 should only consult a local include list may be determined by examining local field 353 of a search message unit 301. Limiting keyword processor 255 to a local include list advantageously minimizes traffic to message server computer 103.

In steps 616, 618, and 620, the keyword is not processed if keyword processor 255 is limited to a local include list and the keyword is not in that local include list. For example, if local field 353 of a search message unit 301 indicates that only a local include list is to be consulted and the keyword is not in the local include list, that particular search message unit 301 will not be triggered for processing.

In step 622, keyword processor 255 sends the keyword to message server computer 103 if keyword processor 255 is not limited to a local include list (step 616 to step 622). Keyword processor 255 also sends the keyword to message server computer 103 if keyword processor 255 is limited to a local include list and the keyword is in that local include list. Message server computer 103 receives the keyword and then employs database 310 (see FIG. 5) to identify search message units 301 in client computer 101 that relate to the keyword and accordingly may need to be processed In step 624, client computer 101 receives a keyword ID and a list of advertiser IDs from message server computer 103, if any. The list of advertiser IDs identify search message units 301 that relate to the keyword. For example, if the keyword is "car" and there is a search message unit 301 containing an advertisement for a car company who is interested in search requests with the word "car" in it, the advertiser ID for that search message unit 301 is sent by message server computer 103 to client computer 101. The keyword ID is an arbitrarily assigned identification for the keyword. The keyword ID may be used for statistical and logging purposes (e.g., how many times the word "car" appeared in a search request). Search message units 301 in client computer 101 whose advertiser IDs match those in the list of advertiser IDs received from message computer 103 are deemed triggered for processing.

In step 626, context watcher 205 identifies the triggered search message units 301 and accordingly alerts message processor 203 to process them.

A triggered search message unit 301 with a displayable message content may be processed by displaying its content. A triggered search message unit 301 with an executable message content may be processed by running its content. For example, a search message unit 301 may include a hyperlink to the URL of one or more web pages designated to contain a search result for a particular keyword. As a further example, a message server computer 103, another search engine (i.e., not the "original" search engine the end-user is actively using), or both may perform a search for the keyword and post the search results on a designated web page pointed to by a search message unit 301 that has been triggered for processing. A message server computer 103 may request the other search engine to perform the search after the message server computer 103 receives the keyword from client computer 101 and deems the keyword relevant.

Figure 7:
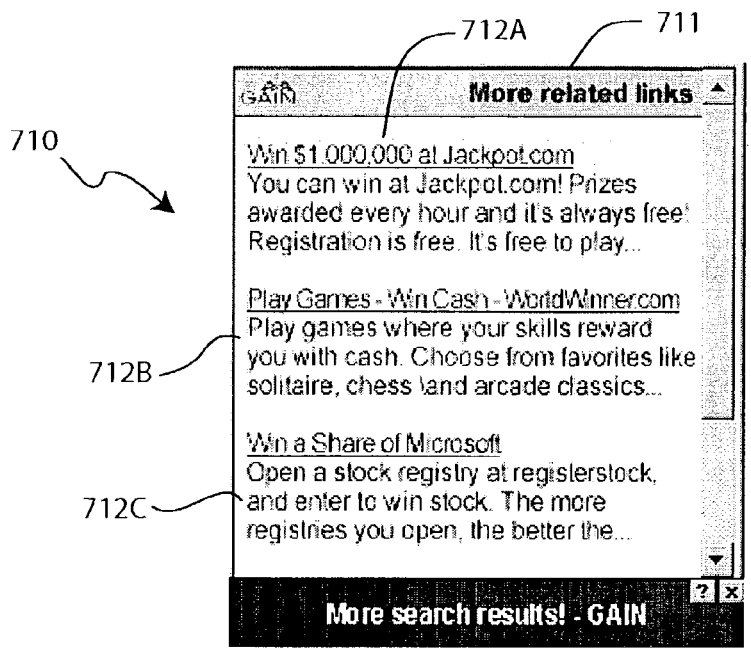
FIGS. 7 and 8 show search results in accordance with embodiments of the present invention.

FIG. 7 shows a search result 710 in accordance with an embodiment of the present invention. Search result 710 includes a window 711 containing items 712 (i.e., 712A, 712B, 712C, . . . ). Each item 712 may be the message content of a triggered search message unit 301. For example, item 712A may be from the message content of a triggered search message unit that relates to the keywords "money" and "cash". As another example, the contents of window 711 may also be from a web page pointed to by a hyperlink in a message content of a triggered search message unit 301; the web page pointed to by the hyperlink may contain the results of a search performed by another search engine.

Figure 8:
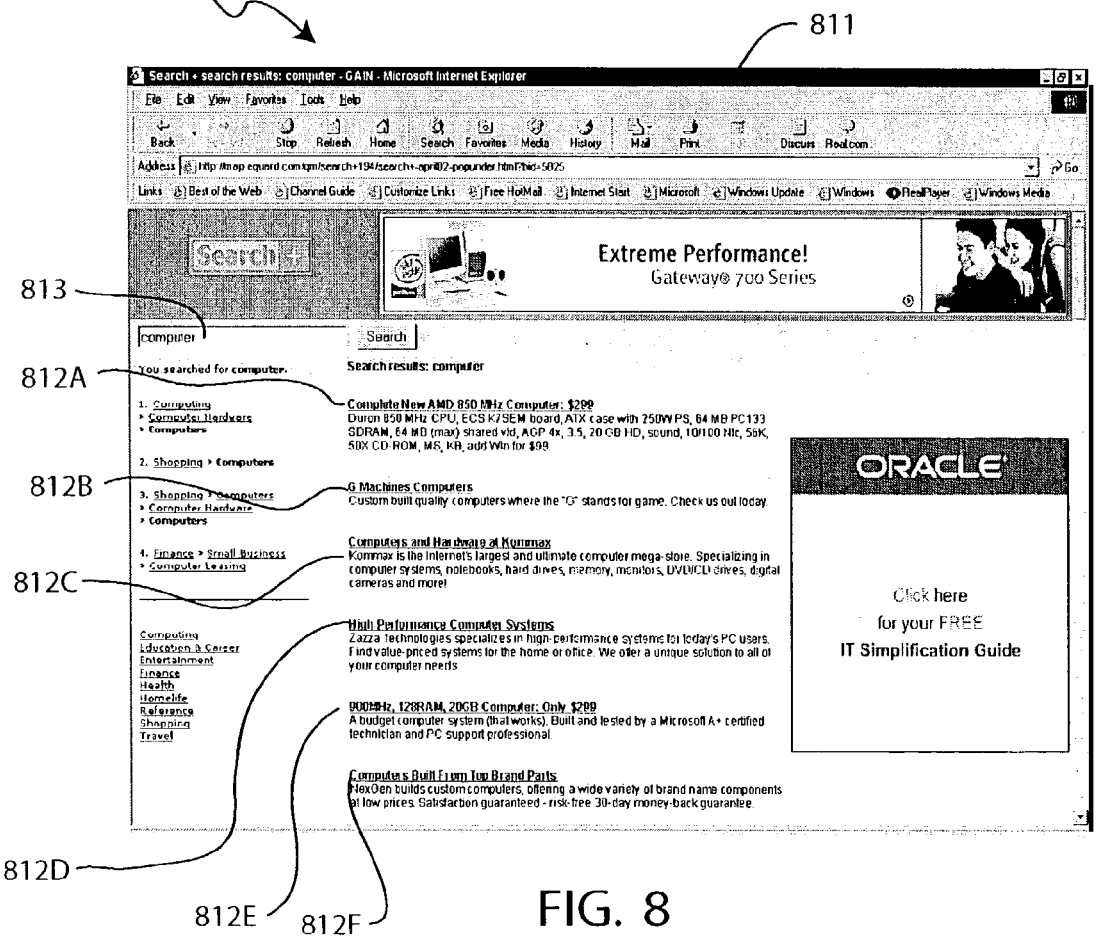

FIG. 8 shows a search result 810 in accordance with an embodiment of the present invention. Search result 810 includes a browser window 811 containing items 812 (i.e., 812A, 812B, 812C, . . . ). Each item 812 may be the message content of a triggered search message unit 301. For example, item 812A may be from the message content of a triggered search message unit 301 that relates to the keyword "computer." As discussed above, items 812 may also be from a search result of another search engine. Browser window 811 further includes a text box 813 containing the keyword "computer", which in this example was the keyword typed by an end-user in the original search engine (not shown) (i.e., the search engine the end-user is actively using). Keyword processor 255 may receive the keyword "computer" from keyword extractor 252, and then paste the keyword in text box 813. Search result 710 of FIG. 7 or search result 810 of FIG. 8 may be displayed on a computer screen under a browser window displaying search results from the original search engine, for example.

In another aspect of the present invention, a search result is displayed in an updateable presentation vehicle. The updateable presentation vehicle may be created once, and then refreshed with new search results as an end-user refines his search. This advantageously minimizes proliferation of presentation vehicles on a computer screen, thereby minimizing clutter and providing more relevant search results to end-users.

In one embodiment, an updateable presentation vehicle comprises a pop-under displayed under a web browser in response to an end-user's search request to an original search engine. The pop-under may contain a search result from another search engine. As the end-user refines his search, a client program (e.g., message delivery program 200) updates the same pop-under to contain the latest search results from the other search engine, for example. By using the same pop-under for subsequent search results, the number of pop-unders provided to the end-user is thus minimized.

FIGS. 9(a)-9(d) schematically illustrate a pop-under 910 (i.e., 910-1, 910-2, 910-3) in accordance with an embodiment of the present invention. In FIGS. 9(a)-9(d), pop-under 910 is labeled as 910-1, 910-2, or 910-3 to distinguish pop-under 910 according to its content. That is, 910-1, 910-2, and 910-3 refer to the same pop-under with different contents. Pop-under 910 may be any type of presentation vehicle that is not immediately available for viewing by the end-user. It should be noted, however, that the present invention is not limited to the use of pop-unders. As will be further described below, embodiments of the present invention may be adapted for use with other types of presentation vehicles.

Figure 9A:
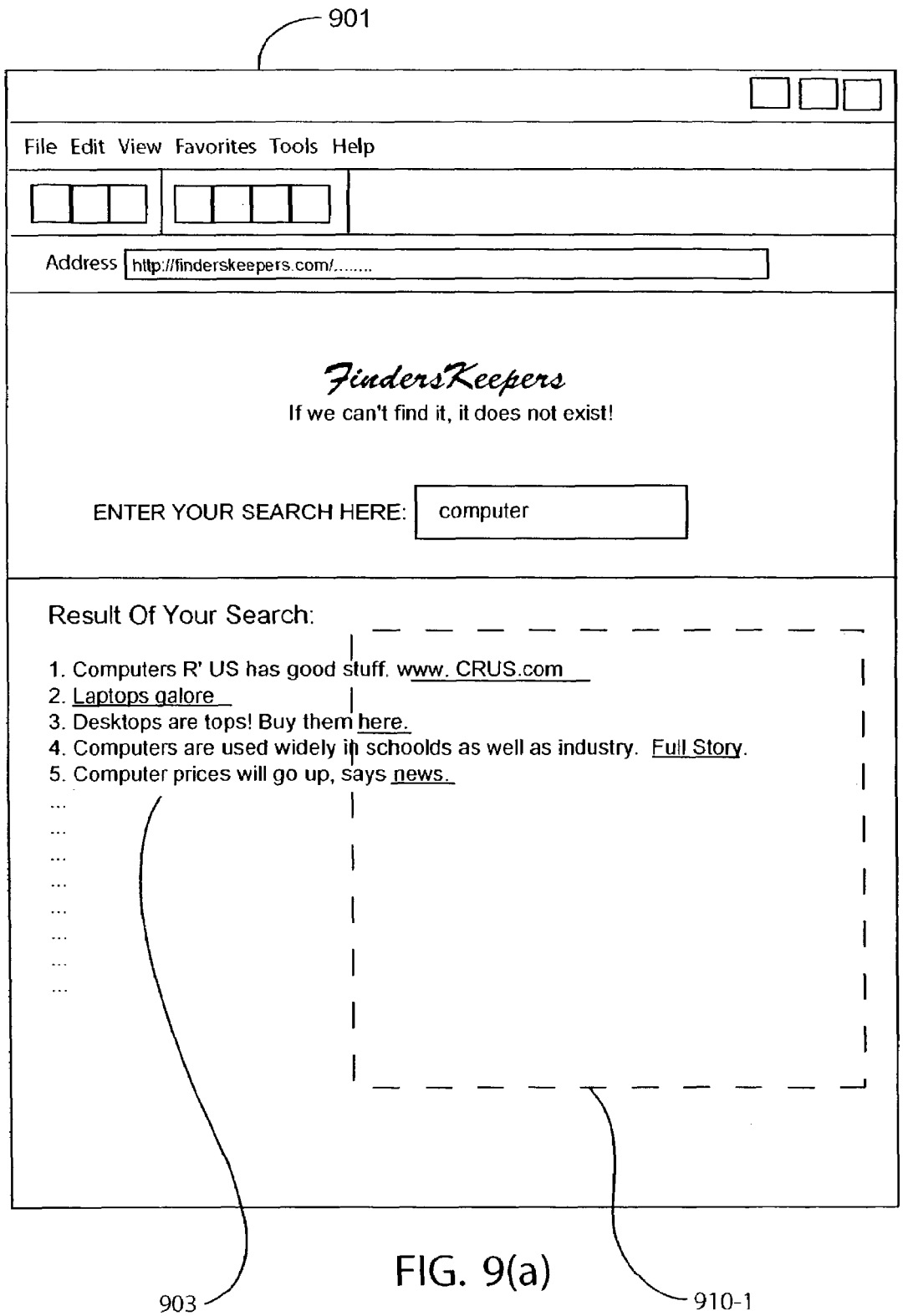
FIGS. 9(a)-9(d) schematically illustrate a pop-under in accordance with an embodiment of the present invention.

In FIG. 9(a), pop-under 910-1 is under a web browser 901. Web browser 901 may be a commercially available web browser such as the Microsoft Internet Explorer™ web browser, for example. Other types of windows capable of displaying information received over a computer network may also be used in lieu of a web browser.

Still referring to FIG. 9(a), web browser 901 contains a search result 903 that is in response to a search request submitted by the end-user to an original search engine. In this example, the original search engine is the fictitious search engine having the URL address "www.finderskeepers.com". Also in this example, the search request is for the keyword "computer". The original search engine performs a search for the keyword "computer", and provides search result 903. Note that search engines in general may comprise a single server computer or a network of server computers. For example, one server computer may be providing a user-interface or serve as a portal for the search engine, while another server computer may be performing the actual search.

As before, message delivery program 200 (see FIG. 3) initiates a search for the same keyword (i.e., "computer") and provides a search result that is displayed in pop-under 910-1. Message delivery program 200 may submit the keyword "computer" to another search engine (not the original search engine, which is finderskeepers.com in this example) that may post a search result on a web page. Message delivery program 200 may then display pop-under 910-1 such that it is pointed to that web page containing the search result.

It is to be noted that as used in the present disclosure, the terms "over", "overlying", "under", and "underlying" refer to the placement of a window that may or may not be directly above or below another window on a computer screen. For example, another window, such as another web browser or a folder, may be placed between web browser 901 and pop-under 910-1. Pop-under 910 is depicted in FIGS. 9(a), 9(b), and 9(c) with a dashed line to indicate that it is under web browser 901.

In the prior art, pop-unders are not normally used for displaying search results. This may be because a search result is typically something an end-user requests for, and is thus conventionally thought of as having to be displayed for immediate viewing by the end-user. In embodiments of the present invention, a pop-under advantageously provides an end-user a second search result while minimizing interruptions to the end-user by displaying the pop-under for later viewing. The second search result may be from search engines not necessarily affiliated with the original search engine. Thus, the search result from the original search engine will most likely be different from the second search result displayed in the pop-under, providing the end-user with a more comprehensive search.

Figure 9B:
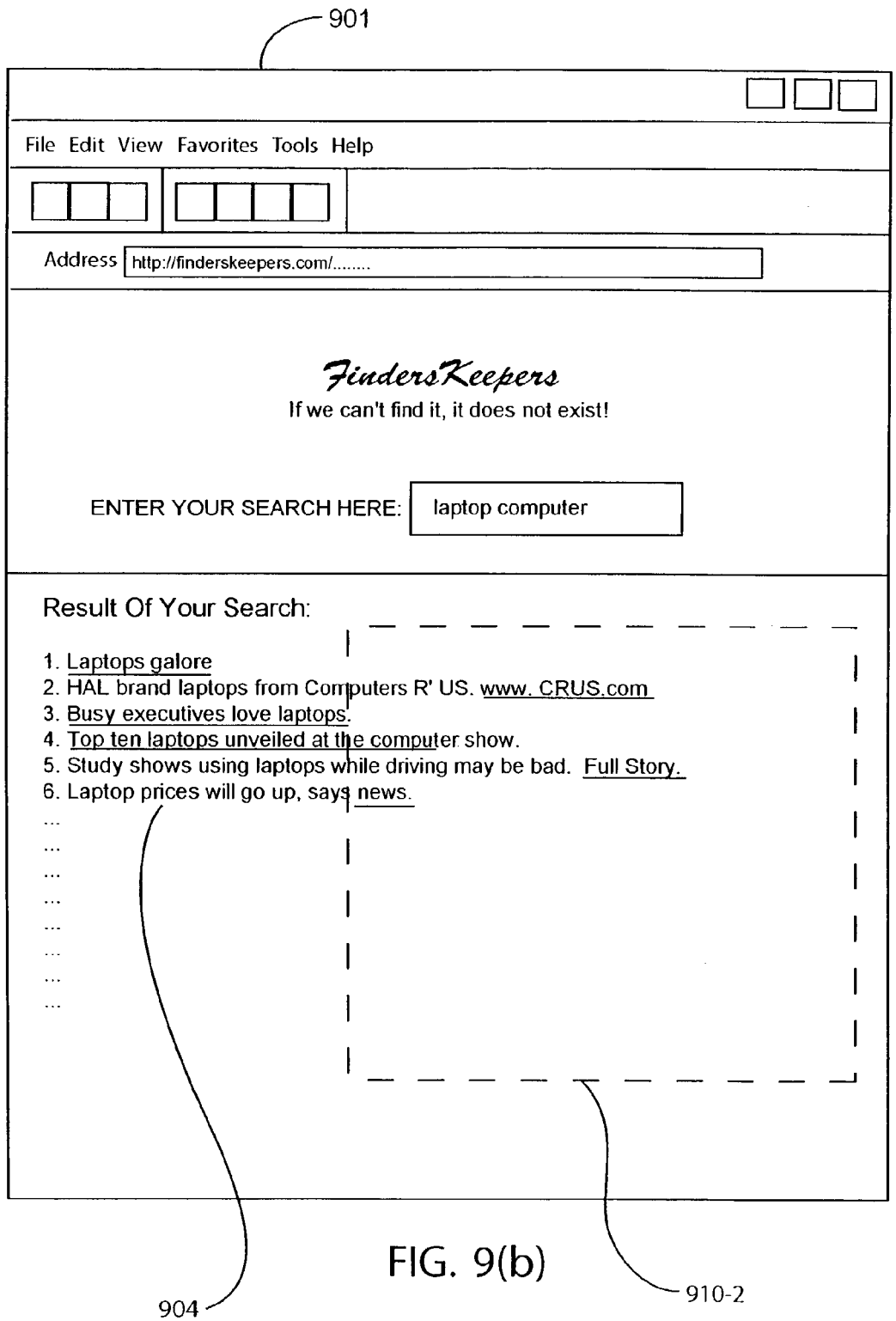

In FIG. 9(b), the end-user refines his search by submitting a search request for the keywords "laptop" and "computer". In response, the original search engine provides a search result 904. Pop-under 910, now labeled 910-2, is updated by message delivery program 200 to contain a new search result (not shown), this time for the keywords "laptop" and "computer". Unlike pop-unders that are created once and stay the same until closed by the end-user, pop-under 910 may be updated to contain more relevant content. In this example, pop-under 910 is updated to contain the most recent search result, thus minimizing proliferation of windows on the end-user's computer screen.

Figure 9C:
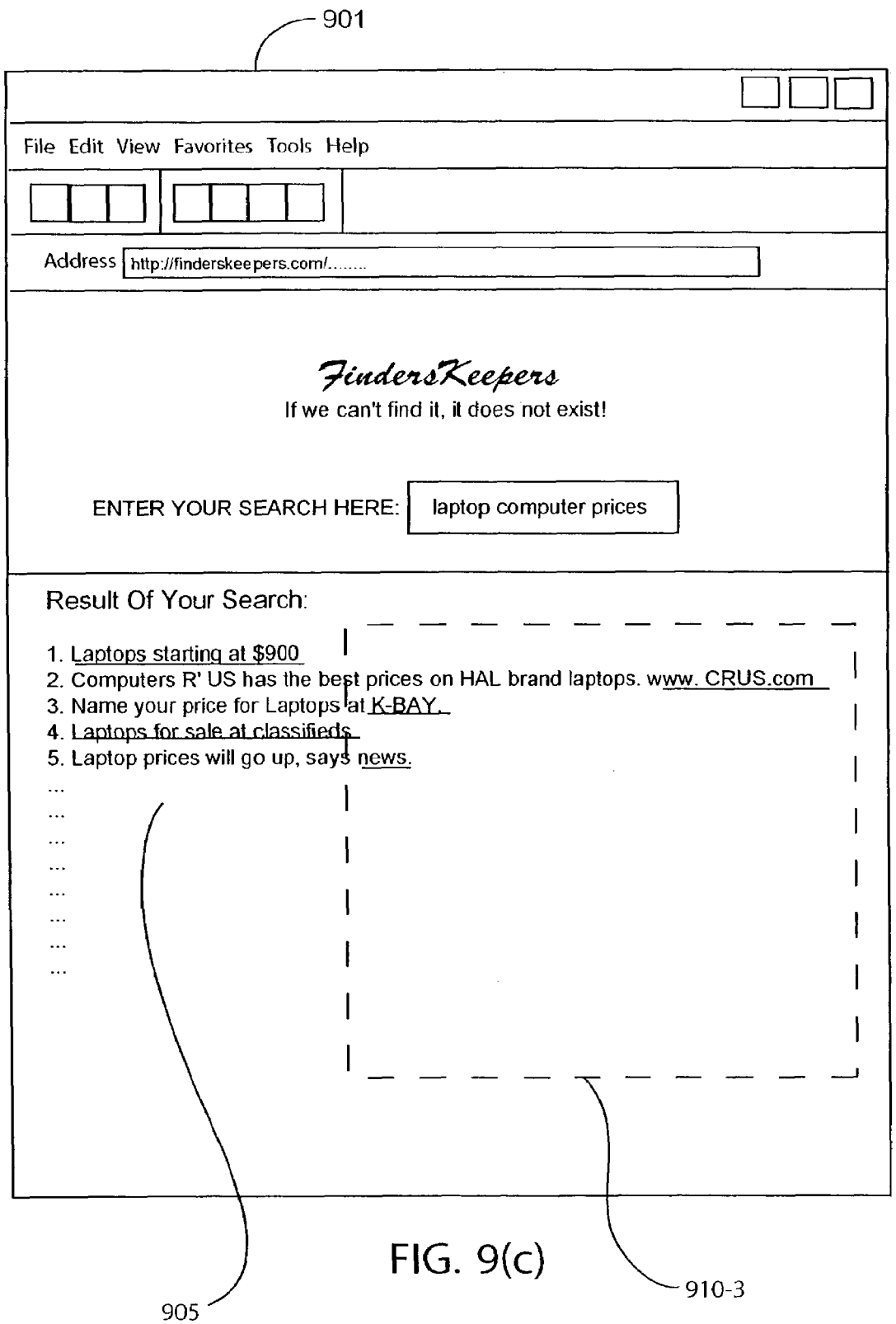

In FIG. 9(c), the end-user refines his search once again by submitting the keywords "laptop", "computer", and "prices" to the original search engine. The original search engine responds to the new search request by providing a search result 905. Pop-under 910, now labeled 910-3, is updated by message delivery program 200 to contain the latest search result, which is responsive to the search request for the keywords "laptop", "computer", and "prices".

Figure 9D:
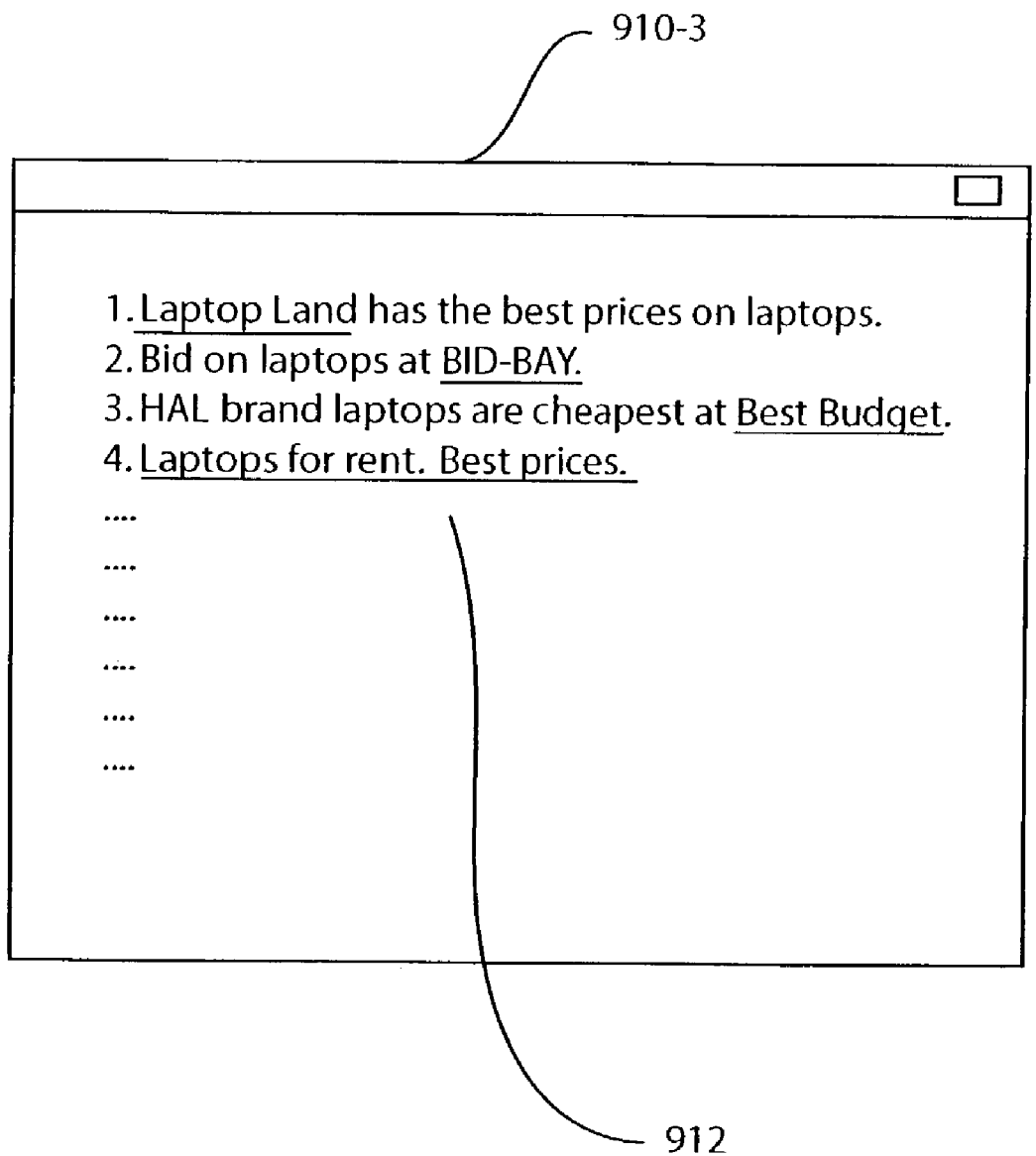

FIG. 9(d) schematically shows how pop-under 910-3 may look like after web browser 901 and other overlying windows are closed, re-arranged, or minimized. In FIG. 9(d), pop-under 910-3 displays a content 912, which is a search result for the keywords "laptop", "computer", and "prices". Pop-under 910 may be updated with another content should the end-user decide to submit another search request.

Figure 10:
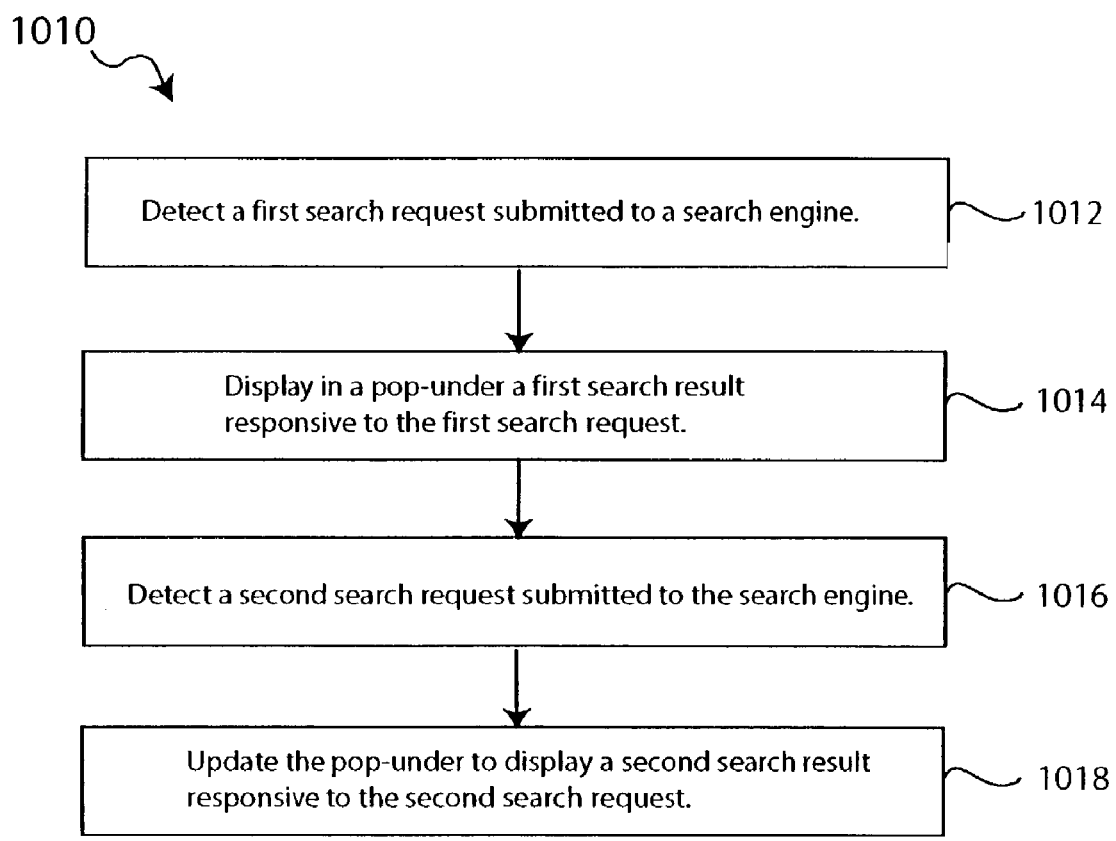
FIG. 10 shows a flow diagram of a method of displaying information received over a computer network in accordance with an embodiment of the present invention.

Referring now to FIG. 10, there is shown a flow diagram of a method 1010 of displaying information received over a computer network in accordance with an embodiment of the present invention. In step 1012, a client program (e.g., a message delivery program 200) detects a first search request submitted by an end-user to an original search engine. In response, the original search engine provides a search result referred to as an "original search result". As is conventional, the original search result may be displayed in the same web browser employed by the end-user to submit the search request.

In step 1014, the client program displays a first search result responsive to the first search request. The first search result may be displayed in a pop-under, which is not viewable until the end-user clears away overlying windows. That is, the first search result may be displayed under the web browser containing the original search result. The first search result may be generated by a single server computer (e.g., a message server computer 103) or a network of server computers that include a search engine.

In step 1016, the client program detects a second search request submitted by the end-user. The second search request may be submitted to the same original search engine or to another original search engine. The second search request may be a refinement of the first search request, or a completely new, unrelated search request.

In step 1018, the client program updates the same pop-under (that used to contain the first search result) to display a second search result responsive to the second search request. For example, the second search result may be posted on the same web page where the first search result was posted. The pop-under, which still points to the same web page, may then be refreshed to display the second search result.

As can be appreciated from the foregoing, an updateable presentation vehicle is useful in applications other than displaying of search results. For example, an updateable pop-up may be employed to display the most current, relevant content. This is in contrast to the conventional way of creating separate pop-ups for different contents.

Figure 11:
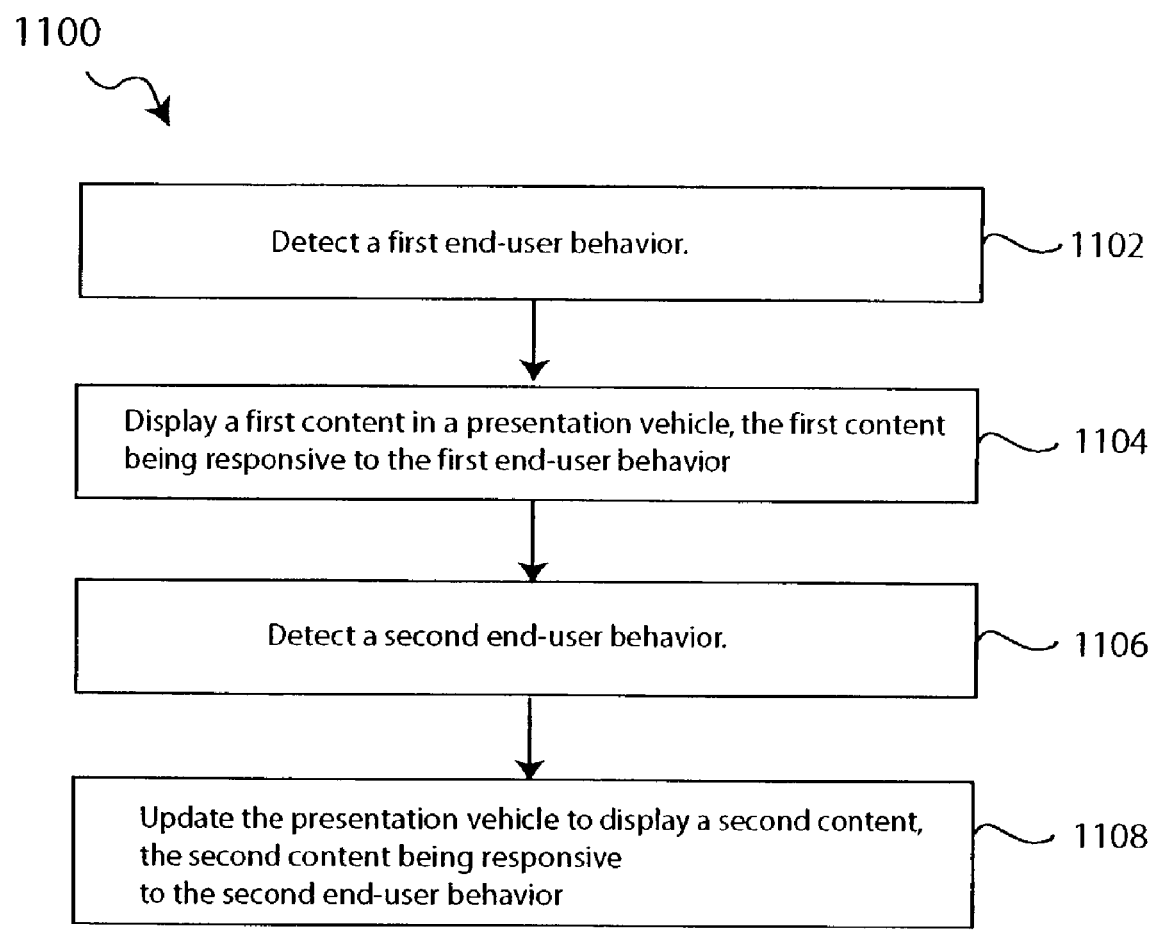
FIG. 11 shows a flow diagram of another method of displaying information received over a computer network in accordance with an embodiment of the present invention.

FIG. 11 shows a flow diagram of a method 1100 of displaying information received over a computer network in accordance with an embodiment of the present invention. In step 1102, a client program (e.g., a message delivery program 200) detects a first end-user behavior. An end-user behavior may be the submission of a search request to an original search engine as described above, or some other activity that an end-user engages in while on the network. For example, an end-user behavior may be navigation from one web site to another web site. The navigation to a particular web site may trigger the client program to initiate delivery of message units to the client computer employed by the end-user. The message units may call for the use of a pop-up or some other presentation vehicle to display advertising or other types of information.

In step 1104, the client program displays a first content in a presentation vehicle in response to the first end-user behavior. For example, the client program may initiate displaying of a search result, an advertisement, or other types of information in the presentation vehicle.

In step 1106, the client program detects a second end-user behavior.

In step 1108, the client program updates the same presentation vehicle with a second content that is responsive to the second end-user behavior. For example, the client program may initiate display of a car advertisement in a pop-up when the end-user navigates from one web site to a car-related web site, and then initiate display of a wine advertisement in the same pop-up when the end-user navigates from the car-related web site to a wine-related web site.

While specific embodiments of the present invention have been provided, it is to be understood that these embodiments are for illustration purposes and not limiting. Many additional embodiments will be apparent to persons of ordinary skill in the art reading this disclosure. Thus, the present invention is limited only by the following claims.

What is claimed is:

1. A method to be performed in a client computer, the method comprising:

displaying a first search result responsive to a first search request in a presentation vehicle, the presentation vehicle being separate from a browser employed to submit the first search request;

detecting a second search request submitted using the browser; and updating the content of the presentation vehicle to display a second search result responsive to the second search request.

2. The method of claim 1 wherein the browser is a web browser and the first and second search requests are submitted to an Internet search engine.

3. The method of claim 1 wherein the presentation vehicle comprises a pop-under.

4. A method to be performed in a client computer, the method comprising:

detecting a first search request submitted to a search engine, the first search request being submitted using a browser;

displaying in the browser a first search result responsive to the first search request; and displaying a second search result responsive to the first search request in a presentation vehicle under the browser.

5. The method of claim 4 wherein the presentation vehicle comprises a pop-under directly underneath the browser.

6. The method of claim 4 further comprising:
    detecting a second search request; and
    displaying a third search result responsive to the second search request in the presentation vehicle under the browser.

* * * * *